United States Patent Office 2,831,018
Patented Apr. 15, 1958

2,831,018
PRODUCTION OF ESTER AMIDES

Hans Georg Trieschmann, Ludwigshafen (Rhine), Lothar Reuter, Ludwigshafen (Rhine)-Oppau, and Wolfgang Arend, Ludwigshafen (Rhine), Germany, assignors to Badische Anilin- & Soda-Fabrik Aktiengesellschaft, Ludwigshafen (Rhine), Germany No Drawing. Application May 1, 1956
Serial No. 581,851

Claims priority, application Germany March 18, 1954

10 Claims. (Cl. 260—490)

The present application is a continuation-in-part of application Serial No. 494,542, filed in the name of Hans Georg Trieschmann, Lothar Reuter, and Wolfgang Arend, on March 15, 1955, now abandoned.

This invention relates to a method of manufacturing ester amides and to new ester amides. More particularly, it is directed to a new method of producing ester amides by reacting an N-substituted ethylene imine with an anhydride of an aliphatic low molecular weight carboxylic acid.

It is already known that the alkylene imines and their derivatives are very reactive substances capable of numerous reactions. Among such reactions, ethylene imine or its derivatives have been reacted with dicarboxylic acids or their chlorides, but the products thereof have been mixtures of unidentifiable compounds lacking technological interest.

The German patent specification No. 711,408 discloses the manufacture of nitrogenous condensation products by reacting an alkylene imine or a polymeric alkylene imine with long-chain aliphatic or cyclic carboxylic or sulfonic acids or their anhydrides or esters.

Among the principal objects of this invention are provisions for the improved manufacture of well defined ester amides having valuable properties.

Another object of this invention is a method of manufacturing ester amides by the interaction of an N-substituted basic reacting ethylene imine with an anhydride of a low molecular weight aliphatic monocarboxylic acid. A further object of this invention is to provide new ester amides which are valuable plasticizers.

Further objects of the invention will be apparent from the more detailed description of the invention.

In accordance with this invention we have now found that the reaction of N-substituted basic reacting ethylene imine with anhydrides of saturated aliphatic monocarboxylic acids containing from 2 to 5 carbon atoms in their molecule results in ester amides which are valuable plasticizers. The reaction, for example, when using an N-substituted ethylene imine and acetic anhydride, proceeds according to the equation:

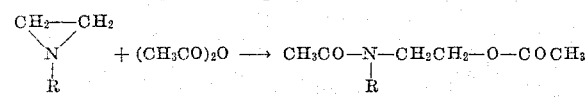

wherein R may be a hydrocarbon radical, for instance an alkyl, cycloalkyl, aryl or aralkyl radical, such as a methyl, ethyl, propyl, butyl, amyl, hexyl, heptyl, octyl, dodecyl, octadecyl, cyclohexyl, phenyl or benzyl radical and other unpolymerizable radicals which may also contain various substituents, such as hydroxyl groups or chlorine atoms. The N-substituted ethylene imines are accessible for example by heating mineral acids of the corresponding N-substituted beta-oxyethylamine or their salts with aqueous solutions of alkali hydroxide. Another method of manufacturing N-substituted ethylene imines consists in the decarboxylation of N-substituted oxazolidones-2 by mineral acids, as for instance hydrochloric acid. A further method for the production of such N-substituted ethylene imines consists in the conversion of N-substituted beta-chlorethyl urethanes by an alkali hydroxide to an N-substituted oxazolidone-2 which is then decarboxylated with a mineral acid. Instead of acetic acid anhydride, anhydrides of other monocarboxylic acids such as propionic acid, butyric acid and valeric acid may be used.

Basic-reacting compounds which contain two or more ethylene imine radicals substituted on the nitrogen atom may also be used for the reaction. Such compounds are, for example, compounds of the general formula:

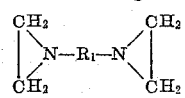

in which $R_1$ may be an unpolymerizable hydrocarbon radical, for instance an alkylene, cycloalkylene or arylene radical. Instead of symmetrical anhydrides of monocarboxylic acids, mixed acid anhydrides of different monocarboxylic acids may also be used.

The basic reacting, substituted ethylene imino compound containing from 1 to 2 substituted ethylene imino groups may also be defined by the general formula

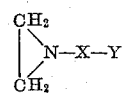

wherein X designates a hydrocarbon radical or a substituted hydrocarbon radical and Y designates a hydrogen atom or the ethylene imino radical of the formula

The reaction proceeds in general at temperatures between —20° and +220° C., preferably at from 50° to 150° C., without the addition of catalysts. Since the exothermic reaction often proceeds very rapidly, intense cooling is sometimes necessary. Cooling may be accomplished, however, by carrying out the reaction in the presence of inert solvents, such as aromatic, hydroaromatic or chlorinated hydrocarbons; i. e. these solvents are used as diluents. Water or compounds containing hydroxyl groups should as far as practicable not be present during the reaction.

The ester amides are produced by a direct addition reaction. The reactions give practically quantitative yields. It is especially remarkable that no polyethylene imines are formed. As a rule, about equimolecular amounts of the initial materials are used. It is also possible, however, to work with an excess of one or the other component.

The reaction products obtainable in accordance with this invention are valuable plasticizers for thermoplastic resins such as polyvinyl chloride and cellulose acetate.

The following examples will further illustrate this invention but the invention is not restricted to these examples. The parts are parts by weight.

Example 1

99 parts of N-butyl ethylene imine are dissolved in 500 parts of methylcyclohexane. The solution is heated to boiling temperature. In the course of two hours while refluxing there is added to the boiling solution a hot solution of 102 parts of acetic anhydride in 1,000 parts of methylcyclohexane. After cooling, the methylcyclohexane is distilled off, first at normal pressure and then in vacuo. There remains an almost colorless oily liquid from which there are isolated by vacuum distillation 190 parts of a colorless liquid boiling at 141° C. at 0.4 mm. Hg and having the formula:

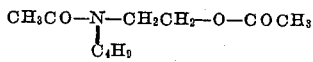

Example 2

150 parts of acetic acid anhydride are heated while stirring to boiling temperature. There are added then without additional heating 80 parts of 1.6-hexylene bis-N-ethylene imine having the formula:

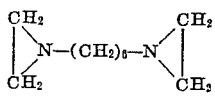

in such a manner that the reaction mixture is kept boiling. After the addition of the ethylene imine compound the mixture is refluxed for one hour. The excess acetic anhydride is then evaporated, and there are obtained 225 parts of viscous light yellow oil. This oil yields, after distillation at 0.005 mm. Hg in a ball pipe still having a heating bath with a temperature of from 220° to 230° C., a practically colorless distillate.

Example 3

130 parts of propionic anhydride are heated to 150° C. while stirring. Then 119 parts of N-phenyl ethylene imine are dropped in at a rate to keep the temperature approximately at 150° C. and stirring is continued at this temperature for one hour. When distilling the mixture under vacuum 228 parts of a reaction product which boils at 127° to 128° C. at a pressure of 0.005 millimeter (mercury gauge) are obtained. The product having a molecular weight of 249 is a colorless, slightly viscous liquid which is applicable as a plasticizer for cellulose acetate.

If valeric anhydride is used instead of propionic anhydride, the product obtained having a molecular weight of 305 is a good-quality plasticizer for polyvinyl chloride. A sheet consisting of 60 parts of polyvinyl chloride and 40 parts of the said plasticizer would pass a cold flexibility test at from minus 25° to minus 30° C.

What we claim is:

1. A method of manufacturing an ester amide which comprises reacting a basic reacting ethylene imine substituted on the nitrogen atom by a hydrocarbon radical selected from the group consisting of alkyl, cycloalkyl, aryl and aralkyl radicals containing 1–18 carbon atoms with an anhydride of an alkanoic acid containing from 2 to 5 carbon atoms in its molecule.

2. A method as claimed in claim 1 wherein the reaction is carried out at a temperature between −20° C. and 220° C.

3. A method as claimed in claim 1 wherein the reaction is carried out in the presence of an inert solvent.

4. A method of manufacturing an ester amide which comprises reacting N-methylethylene imine with acetic acid anhydride.

5. A method of manufacturing an ester amide which comprises reacting N-butyl ethylene imine with acetic acid anhydride.

6. A method of manufacturing an ester amide which comprises reacting N-cyclohexyl ethylene imine with acetic acid anhydride.

7. A method of manufacturing an ester amide which comprises reacting a compound of the formula

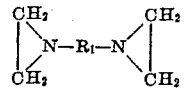

wherein $R_1$ is a lower alpha, omega-alkylene radical with an anhydride of an alkanoic acid containing from 2 to 5 carbon atoms in its molecule.

8. A method of manufacturing an ester amide which comprises reacting 1,6-hexyl-bis-N-ethylene imine with acetic acid anhydride.

9. A method as claimed in claim 1 wherein the reaction is carried out in the presence of a solvent devoid of hydroxyl groups.

10. A method in accord with claim 7 wherein the reaction is carried out in the presence of a solvent devoid of hydroxyl groups.

References Cited in the file of this patent

UNITED STATES PATENTS

| | | |
|---|---|---|
| 2,290,881 | Katzman | July 28, 1942 |
| 2,472,901 | Johnston et al. | June 14, 1949 |
| 2,624,755 | Gluesenkamp | Jan. 6, 1953 |

FOREIGN PATENTS

| | | |
|---|---|---|
| 711,408 | Germany | Oct. 1, 1941 |